(12) United States Patent
Lambert et al.

(10) Patent No.: US 8,738,619 B2
(45) Date of Patent: May 27, 2014

(54) METHOD AND SYSTEM FOR DATA AGGREGATION, TARGETING AND ACQUISITION (75) Inventors: Jerry Lambert, Grapevine, TX (US); Shiraz Khalid, Addison, TX (US)

(73) Assignee: Touchstone Systems, Inc., Dallas, TX (US)

( * ) Notice: Subject to any disclaimer, the term of this patent is extended or adjusted under 35 U.S.C. 154(b) by 611 days.

(21) Appl. No.: 12/752,352

(22) Filed: Apr. 1, 2010

(65) Prior Publication Data
US 2010/0257144 A1 Oct. 7, 2010

Related U.S. Application Data (60) Provisional application No. 61/202,762, filed on Apr. 1, 2009.

(51) Int. Cl.
*G06F 17/30* (2006.01)
(52) U.S. Cl.
USPC .......................................... 707/736; 707/689
(58) Field of Classification Search
None
See application file for complete search history.

(56) References Cited

U.S. PATENT DOCUMENTS

| 6,125,360 | A  | * | 9/2000  | Witkowski et al. | 1/1 |
| 6,334,128 | B1 | * | 12/2001 | Norcott et al.   | 1/1 |
| 7,231,396 | B2 | * | 6/2007  | Ayachitula et al.| 1/1 |
| 7,590,620 | B1 | * | 9/2009  | Pike et al.      | 1/1 |

* cited by examiner

*Primary Examiner* — Belinda Xue
(74) *Attorney, Agent, or Firm* — Andrews Kurth LLP; Sean S. Wooden; Matthew J. Esserman (57) ABSTRACT

Systems and methods for data aggregation, targeting and acquisition are described. A method may receive data and storing the data in one or more source data tables and select one of the one or more source data tables. The selected source data table includes updated data fields. The method may also identify a plurality of destination data tables that need to be updated, in which each destination data table is linked to and contains an aggregation of a subset of data from the selected source data table, identify one or more data fields in the identified destination data tables that need to be updated with data from the updated data fields in the selected source data table, and determine using the processor, for each identified destination data table, a best aggregation source data table. The best aggregation source data table may be a data table that contains all of the data fields of the destination data table and has the fewest data fields, and the best aggregation source data table may be the selected source data table or another destination data table.

20 Claims, 9 Drawing Sheets

SUMMARY_TABLE_STATUS 410

| TABLE_NAME | DATA_START_DATE | DATA_END_DATE | ACTIVE | REPORTING | SUMMARIZE | SCORE | DATE_FORMAT | REALM |
|---|---|---|---|---|---|---|---|---|
| CDR_DETAIL_TABLE | 2008-01-01 00:00:00 | 3000-01-01 00:00:00 | 1 | 1 | 1 | 0 | Y-m-d T | CDRS |
| CDR_SUMMARY_TABLE_1 | 2008-01-01 00:00:00 | 3000-01-01 00:00:00 | 1 | 1 | 1 | 100 | Y-m-d | CDRS |
| CDR_SUMMARY_TABLE_2 | 2008-01-01 00:00:00 | 3000-01-01 00:00:00 | 1 | 1 | 1 | 200 | Y-m-d | CDRS |
| LOG_DETAIL_TABLE | 2008-01-01 00:00:00 | 3000-01-01 00:00:00 | 1 | 1 | 1 | 0 | Y-m-d T | LOGS |
| LOG_SUMMARY_TABLE_1 | 2008-01-01 00:00:00 | 3000-01-01 00:00:00 | 1 | 1 | 1 | 100 | Y-m-d | LOGS |

*FIG. 4A*

SUMMARY_FIELD_DEFS TABLE

| FIELD_NAME | SOURCE | SOURCE_NAME | ACTUAL_FIELD_NAME | FUNCTION |
|---|---|---|---|---|
| CDR_CHARGES | TABLE | CDR_DETAIL_TABLE | Charges | |
| CDR_CUSTOMER | TABLE | CDR_DETAIL_TABLE | Customer | |
| CDR_NETREV | TABLE | CDR_DETAIL_TABLE | Net Revenue | |
| CDR_REVENUE | TABLE | CDR_DETAIL_TABLE | Revenue | |
| CDR_SUPPLIER | TABLE | CDR_DETAIL_TABLE | Supplier | |
| CDR_TIMESTAMP | TABLE | CDR_DETAIL_TABLE | Timestamp | |
| CDR_TRANSACTIONS | TABLE | CDR_DETAIL_TABLE | Transactions | |
| CDR_CHARGES | TABLE | CDR_SUMMARY_TABLE_1 | Charges | sum |
| CDR_CUSTOMER | TABLE | CDR_SUMMARY_TABLE_1 | Customer | |
| CDR_NETREV | TABLE | CDR_SUMMARY_TABLE_1 | Net Revenue | sum |
| CDR_REVENUE | TABLE | CDR_SUMMARY_TABLE_1 | Revenue | sum |
| CDR_TIMESTAMP | TABLE | CDR_SUMMARY_TABLE_1 | Timestamp | |
| CDR_CHARGES | TABLE | CDR_SUMMARY_TABLE_2 | Charges | sum |
| CDR_NETREV | TABLE | CDR_SUMMARY_TABLE_2 | Net Revenue | sum |
| CDR_REVENUE | TABLE | CDR_SUMMARY_TABLE_2 | Revenue | sum |
| CDR_TIMESTAMP | TABLE | CDR_SUMMARY_TABLE_2 | Timestamp | |
| LOG_DEST_IP | TABLE | LOG_DETAIL_TABLE | Dest IP | |
| LOG_SRC_IP | TABLE | LOG_DETAIL_TABLE | Source IP | |
| LOG_TIME | TABLE | LOG_DETAIL_TABLE | Timestamp | |
| TOTAL_JITTER | TABLE | LOG_DETAIL_TABLE | Jitter | |
| TOTAL_PACKETLOSS | TABLE | LOG_DETAIL_TABLE | Packetloss | |
| LOG_DEST_IP | TABLE | LOG_SUMMARY_TABLE_1 | Dest IP | |
| LOG_SRC_IP | TABLE | LOG_SUMMARY_TABLE_1 | Source IP | |
| LOG_TIME | TABLE | LOG_SUMMARY_TABLE_1 | Timestamp | |
| TOTAL_JITTER | TABLE | LOG_SUMMARY_TABLE_1 | Jitter | sum |
| TOTAL_PACKETLOSS | TABLE | LOG_SUMMARY_TABLE_1 | Packet Loss | sum |
| NEXTONE_CALLS | SCRIPT | nextone_data.pl | Calls | sum |
| NEXTONE_LOAD | SCRIPT | nextone_data.pl | Load | |

FIG. 4B

CDR_DETAIL_TABLE 430

| TIMESTAMP | CUSTOMER | SUPPLIER | REVENUE | CHARGES | NET REVENUE | TRANSACTIONS |
|---|---|---|---|---|---|---|
| 2009-01-01 02:02:00 | SO Digital | MyComm | 1 | 34 | -33 | 2 |
| 2009-01-01 00:11:12 | MMYI | Juraz | 23 | 3 | 20 | 4 |
| 2009-01-01 00:03:00 | Rotels | MyComm | 2 | 43 | -41 | 2 |
| 2009-01-01 03:00:00 | SO Digital | MyComm | 3 | 3 | 0 | 1 |
| 2009-01-01 04:00:00 | Rotels | MyComm | 5 | 32 | -27 | 33 |
| 2009-01-01 06:00:00 | SO Digital | Juraz | 32 | 5 | 27 | 4 |
| 2009-01-01 09:00:23 | SO Digital | Juraz | 23 | 6 | 17 | 6 |
| 2009-01-01 10:00:00 | Rotels | Juraz | 12 | 7 | 5 | 2 |

*FIG. 4C*

CDR_SUMMARY_TABLE_1 440

| TIMESTAMP | CUSTOMER | REVENUE | CHARGES | NET REVENUE |
|---|---|---|---|---|
| 2009-01-01 | MMYI | 23 | 3 | 20 |
| 2009-01-01 | Rotels | 19 | 82 | -63 |
| 2009-01-01 | SO Digital | 59 | 48 | 11 |

*FIG. 4D*

CDR_SUMMARY_TABLE_2 — 450

| TIMESTAMP | REVENUE | CHARGES | NET REVENUE |
|---|---|---|---|
| 2009-01-01 | 101 | 133 | -32 |

FIG. 4E

LOG_DETAIL_TABLE — 460

| TIMESTAMP | SOURCE IP | DEST IP | JITTER | PACKET LOSS |
|---|---|---|---|---|
| 2009-01-01 02:02:00 | 129.91.231.1 | 1.2.3.4 | 432 | 2 |
| 2009-01-01 00:11:12 | 23.1.2.4 | 5.4.5.5 | 234 | 2 |
| 2009-01-01 00:03:00 | 23.1.2.4 | 5.4.5.5 | 3 | 34 |
| 2009-01-01 03:00:00 | 23.1.2.4 | 5.4.5.5 | 3124 | 342 |
| 2009-01-01 04:00:00 | 129.91.231.1 | 1.2.3.4 | 87 | 2 |
| 2009-01-01 06:00:00 | 11.2.1.2 | 1.2.3.4 | 2344 | 5 |
| 2009-01-01 09:00:23 | 212.32.44.2 | 42.21.21.2 | 5123 | 1 |
| 2009-01-01 04:00:00 | 212.32.44.2 | 192.168.3.1 | 3 | 7 |

FIG. 4F

| LOG_SUMMARY_TABLE_1 | | | |
|---|---|---|---|
| TIMESTAMP | SOURCE IP | JITTER | PACKET LOSS |
| 2009-01-01 | 11.2.1.2 | 2344 | 5 |
| 2009-01-01 | 129.91.231.1 | 519 | 4 |
| 2009-01-01 | 212.32.44.2 | 5126 | 8 |
| 2009-01-01 | 23.1.2.4 | 3361 | 378 |

METHOD AND SYSTEM FOR DATA AGGREGATION, TARGETING AND ACQUISITION

BACKGROUND

High volume transaction businesses depend upon their back office system's ability to provide fast and accurate reporting. Since the transactional data could potentially be millions of records, an application is needed that is able to aggregate the transactions and report on them in seconds.

Many data processing applications today are responsible for hundreds of millions or even billions of transactions in total with millions of new transactions being added every day. With that volume of information flowing into a system it is important to clearly understand the purpose of the information as it applies to each potential type of user. Different users require different subsets of information, different tabulation of the information and even different performance in reporting. When the Chief Financial Officer ("CFO") of a company runs a report on the revenue by Day across 200 million transactions for a month, the system should access only those pieces of "perfected" information necessary to process his request in the most efficient way possible (he is an officer of the company and has very little time or tolerance for waiting). When a network designer wants to determine the performance of a particular piece of equipment for an hour for the previous hour to troubleshoot a problem, the network designer's path through the information and the resources allocated (either in ad-hoc or as a part of a capacity plan) is likely to be very different than that of the CFO. Access to information is rarely so much a matter of equality as it is a matter of planning and resource allocation within the real-world needs of an information technology (IT) environment.

A problem to be solved is: how does a system responsible for storing and retrieving such high volumes of information match the needs of the users with the resources available and how are those available resources identified in real-time as the most effective and/or necessary resources to be leveraged in both storing and retrieving information from multiple sources in multiple formats.

High-end database vendors, such as Oracle, attempt to be all things to all people by focusing on indexes, automated aggregation and caching strategies and an ever-increasing dependence on processing power. Indexes are very important for database processing. Indexes increase retrieval speeds significantly. However, when the volumes of data get as large as hundreds of millions of records, an index's ability to deliver rapid responses (less than 10 seconds) diminishes. Even with very effective indexes, the time required to summarize 200 million records ad-hoc is prohibitive. In some cases, to deal with this limitation, the databases will attempt to either aggregate information automatically (based on the queries that have been processed) or to cache the information (based on the most current information either written or retrieved). These techniques are useful in some cases, but fall short when faced with the huge volume of data being contemplated herein.

SUMMARY

Embodiments described herein have numerous advantages, including overcoming the defects of the prior art. These advantages may be achieved by a method for data aggregation, targeting and acquisition. The method may receive data and storing the data in one or more source data tables and select one of the one or more source data tables. The selected source data table includes updated data fields. The method may also identify a plurality of destination data tables that need to be updated, in which each destination data table is linked to and contains an aggregation of a subset of data from the selected source data table, identify one or more data fields in the identified destination data tables that need to be updated with data from the updated data fields in the selected source data table, and determine using the processor, for each identified destination data table, a best aggregation source data table. The best aggregation source data table may be a data table that contains all of the data fields of the destination data table and has the fewest data fields, and the best aggregation source data table may be the selected source data table or another destination data table.

These advantages may also be achieved by a method for data aggregation, targeting and acquisition that receives a request for a data report, identifies, from the request, data fields needed to fulfill the request, finds data tables that contain the identified data fields, selects, from the found data tables, the data table with the fewest data fields and retrieves data from the identified data fields from the selected data table with the fewest data fields.

These advantages may also be achieved by a system for data aggregation, targeting and acquisition. The system includes a computer including a processor and memory in which the memory includes a computer program stored therein that includes instructions that are executed by the processor for aggregating data by receiving data and storing the data in one or more source data tables, selecting one of the one or more source data tables, identifying a plurality of destination data tables that need to be updated, identifying one or more data fields in the identified destination data tables that need to be updated with data from the updated data fields in the selected source data table, and determining, using the processor, for each identified destination data table, a best aggregation source data table, in which the best aggregation source data table is a data table that contains all of the data fields of the destination data table and has the fewest data fields, and the best aggregation source data table may be the selected source data table or another destination data table.

These advantages may also be achieved by a system for data aggregation, targeting and acquisition that includes a computer including a processor and memory, in which the memory includes a computer program stored therein that includes instructions that are executed by the processor for targeting data by receiving a request for a data report, identifying from the request, data fields needed to fulfill the request, finding data tables that contain the identified data fields, selecting, from the found data tables, the data table with the fewest data fields, and retrieving data from the identified data fields from the selected data table with the fewest data fields.

BRIEF DESCRIPTION OF THE DRAWINGS

The detailed description may refer to the following drawings, wherein like numerals refer to like elements, and wherein.

DETAILED DESCRIPTION

Described herein are embodiments of a method and system for data aggregation, targeting and acquisition. Embodiments include methods, systems and software, e.g., embodied as computer-executable instructions stored on computer readable mediums, that may be referred to as a data aggregation, targeting and acquisition system (D.A.T.A). Embodiments of D.A.T.A. may be designed to aggregate real-time transactional data into summary tables. When processing a report request, embodiments of D.A.T.A. may intelligently target available data tables and respond in the fastest possible time.

Embodiments of D.A.T.A may solve the above problems by using a two phased approach referred to as "aggregation" (storage) and "targeting" (retrieval). In an embodiment, both phases may use the same configuration tables (e.g., "SUMMARY_TABLE_STATUS" and "SUMMARY_FIELD_DEFS" tables) to determine what actions need to be taken and what tables, scripts and data to use for each action. The Summary Table Status (SUMMARY_TABLE_STATUS) and Summary Field Definitions (SUMMARY_FIELD_DEFS) tables may be populated with entries of the various data tables in an implementation by an administrator or other user during implementation of the D.A.T.A system. New tables may be added if new source tables become available or if new summary tables need to be created. The following tables provide descriptions of the fields in exemplary configuration tables, Summary Table Status and Summary Field Definitions tables.

TABLE A

SUMMARY_TABLE_STATUS

| Column Name | Column Description |
| --- | --- |
| Table_Name | Name of the data table being managed by the D.A.T.A system |
| Data_Start_Date | Beginning of the effective date range for the data on this record |
| Data_End_Date | End of the effective date range for the data on this record |
| Active | A binary flag indicating whether or not this record is active and should be considered |
| Reporting | A binary flag indicating whether or not this record should be considered for targeting |
| Summarize | A binary flag indicating whether or not this record should be considered for aggregation |
| Score | 0 = base table used as source for aggregation and detail reporting. Targeting uses this value to determine the most efficient table to use for retrieving exactly the data requested. As it applies to targeting, the lower the SCORE the more detail and, therefore, the larger amount of data with a higher score indicating less detail and faster retrieval. |
| Date_Format | Format string for date data. This is used to apply precision to the dates depending on the targeting level. |
| Realm | Used to group types of information or sources of information together for purposes of clarity and conflict avoidance as it might apply to field names. |

TABLE B

SUMMARY_FIELD_DEFS

| Column Name | Column Description |
| --- | --- |
| Field_Name | Alias for the Actual_Field_Name to avoid potential naming conflicts across tables |
| Source | Indicates the type of access. TABLE refers to a database table. SCRIPT refers to a script or program that will be run. |
| Source_Name | In the case of a TABLE source this is the physical table name. In the case of a SCRIPT source this is the name of the script/program to be executed |
| Actual_Field_Name | Name of the field in the detail table to be processed (aggregation or targeting) |
| Function | Action to be taken during aggregation, (e.g., sum, avg, count) |

The Summary Table Status and Summary Field Definitions tables are linked together. For example, in embodiments, the field Table_Name in Summary Table Status table is linked to the Source_Name field in Summary Field Definitions table.

Figure 1:
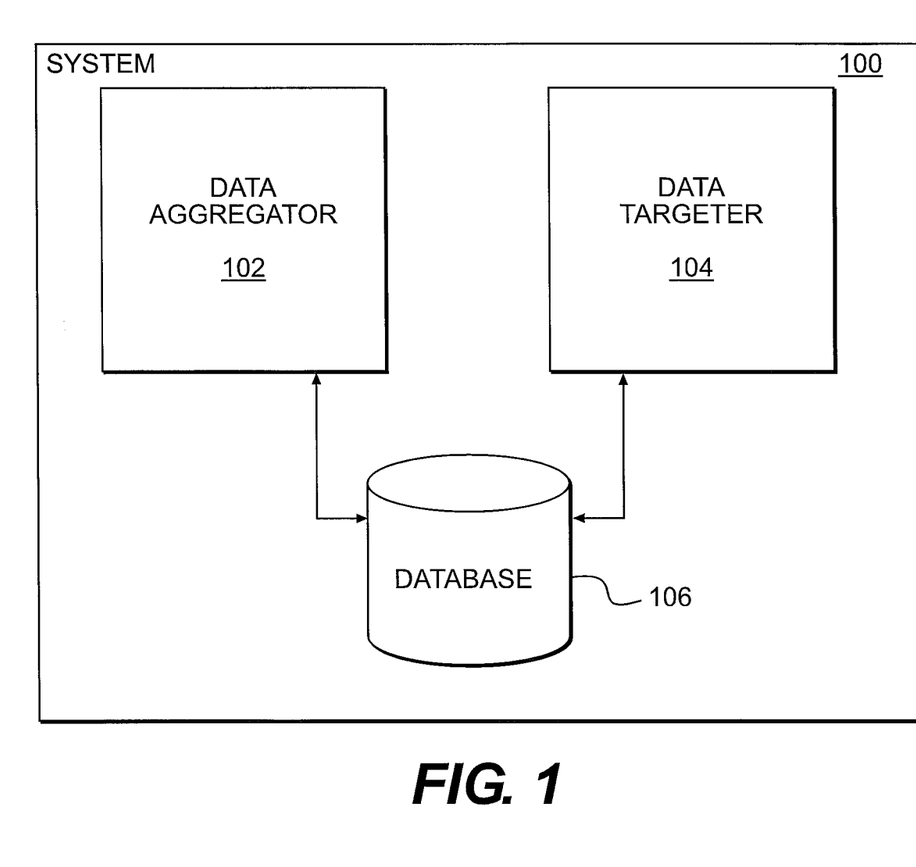
FIG. 1 is a block diagram illustrating an embodiment of a system for data aggregation, targeting and acquisition.

With reference now to FIG. 1, shown is a block diagram illustrating components of an embodiment a system 100 for data aggregation, targeting and acquisition. As shown, system 100 may include a data aggregator 102 and a data targeter 104. System 100 may also include a common database 106, which may store the configuration tables used by data aggregator 102 and a data targeter 104.

Incoming real-time transactional data, or other data, may also be stored in database 106 as source or detail tables. The incoming data may be organized and stored in such source tables using known methods (e.g., a script or computer program may be run to process the incoming data to store it in appropriate fields in a source table). As incoming data continues to arrive, the source table(s) storing the incoming data may be continuously updated. System 100 manages these source tables as described herein.

Entries corresponding to the source data tables will be stored in the Summary Table Status table used by system 100. As new types of real-time transactional data are received, new source tables will be created and new entries corresponding to the new source tables will be created in the Summary Table Status table.

The Summary Table Status table used by system 100 will also include entries corresponding to summary or destination tables that include aggregations of the source table data. These destination tables enable system 100, specifically data targeter 104, to more efficiently and effectively target and retrieve data in response to data requests. The destination tables may be created by data aggregator 102 per configuration data stored in Summary Table Status table and Summary Field Definitions table, or may be received along with the source data. The Summary Field Definitions table will include entries for all the fields in the source tables and the corresponding destination tables. Links between the source tables and corresponding destination tables will be seen by the field names. Shared field names will indicate a link. The configuration data may be set using any method that has the ability to modify a database table. The setting can be done via Structured Query Language ("SQL") statements, a database management front end or through an upper level application. Typically, an administrator will set up the configuration data in the Summary Table Status table and Summary Field Definitions table.

With continuing reference to FIG. 1, in embodiments described herein, data aggregator 102 receives and aggregates incoming real-time transactional data. After receiving the incoming data, the data aggregator 102 may aggregate the data. Data aggregator 102 may select a source data table from the data table entries in the Summary Table Status table. Data aggregator 102 may select the source data table corresponding to the received incoming data. For example, the source table that has a 'Realm' corresponding to the incoming data may be selected. As indicated above, a data table with the Score=0 will have the most detailed data. Consequently, the source data tables will have a Score=0 in the Summary Table Status table. The name of the selected source table will be stored in the 'Table_Name' column in the Summary Table Status table. Accordingly, this step identifies the most detailed source table for the data.

After selecting the source table, data aggregator 102 may identify the new records and then stamp or tag the new records in the selected source table from the previous step with a batch number. The purpose of this step is to identify the records that have been aggregated and to put them within a group so that they can be tracked through the by the aggregator 102. Data aggregator 102 then selects the corresponding destination or summary data tables corresponding to the selected source table. To do this, aggregator 102 may selects data tables, from Summary Table Status table that have a SCORE>0 and that have the same 'Realm' entry as the selected source table. Each selected table will have the name stored in the 'Table_Name' column of the corresponding entry of Summary Table Status table. The selected tables are the summary or destination tables for the data.

With continuing reference to FIG. 1, data aggregator 102 identifies which fields need to be aggregated in each of the selected destination tables using the 'Table_Name' and 'Realm' for each selected destination table from the previous step and the corresponding 'Actual_Field_Names' entries in the Summary Field Definitions table. Destination tables typically contain fewer fields than their corresponding source table and different destination tables may have different fields. The idea here is for the data aggregator 102 to identify the table structure of the destination table that needs to be worked on and to create the destination table if needed—if a destination table listed in the Summary Table Status and Summary Field Definitions tables does not exist.

For each destination table, data aggregator 102 identifies the best aggregation source table for the aggregation data, (table entries in Summary Table Status table for which 'SCORE'=0 or previously aggregated table of the current batch), in the same 'Realm' and the source table using the active tables in Summary Table Status table and the corresponding Actual_Field_Names in the Summary Field Definitions table. Since summaries or destination tables are built on top of each other, it is possible that, e.g., a destination table "table1" may have fewer fields than a destination table "table2," but all table1 fields are in table2. In that case, if table2 has been updated/added with the data from the current batch (has new data), then there will be no need to get aggregation data for destination table table1 from a source table that is more detailed than destination table table2. Consequently, the best source table for a destination table may actually be another destination table. This situation is like building a pyramid; if the layer beneath the current one has been updated and contains all the information needed for the current layer, then no need to go all the way to the bottom layer to get the data to populate the current layer. Data aggregator 102 may examine the fields of each data table in a given Realm, as set forth in the Summary Field Definitions table, and determine which data table is the best source table (i.e., which data table has the fewest data fields while having all the required data) for each destination table.

Data aggregator 102 deactivates each destination table in the Summary Table Status table, retrieves the data records from the identified source table (which may be another destination table) and adds/updates the records retrieved from the identified source tables for the current batch. Data aggregator 102 may deactivate a table by setting the table's Active flag in the Summary Table Status table to 0. This causes the table to be "inactive" so that it will be ignored completely—i.e., table will not be accessed for reporting or aggregation by other tables. This is important to do because, until the table is updated with the new data, it is not up to date and accurate. Note, if a Summarize flag is set to 0, the table will not be used for aggregation by other tables, but may be used for reporting. If Reporting flag is set to 0, table will not be used for reporting, but may be used for aggregation. After updating, data aggregator 102 activates the destination table in the Summary Table Status table for reporting and aggregation.

Figure 2:
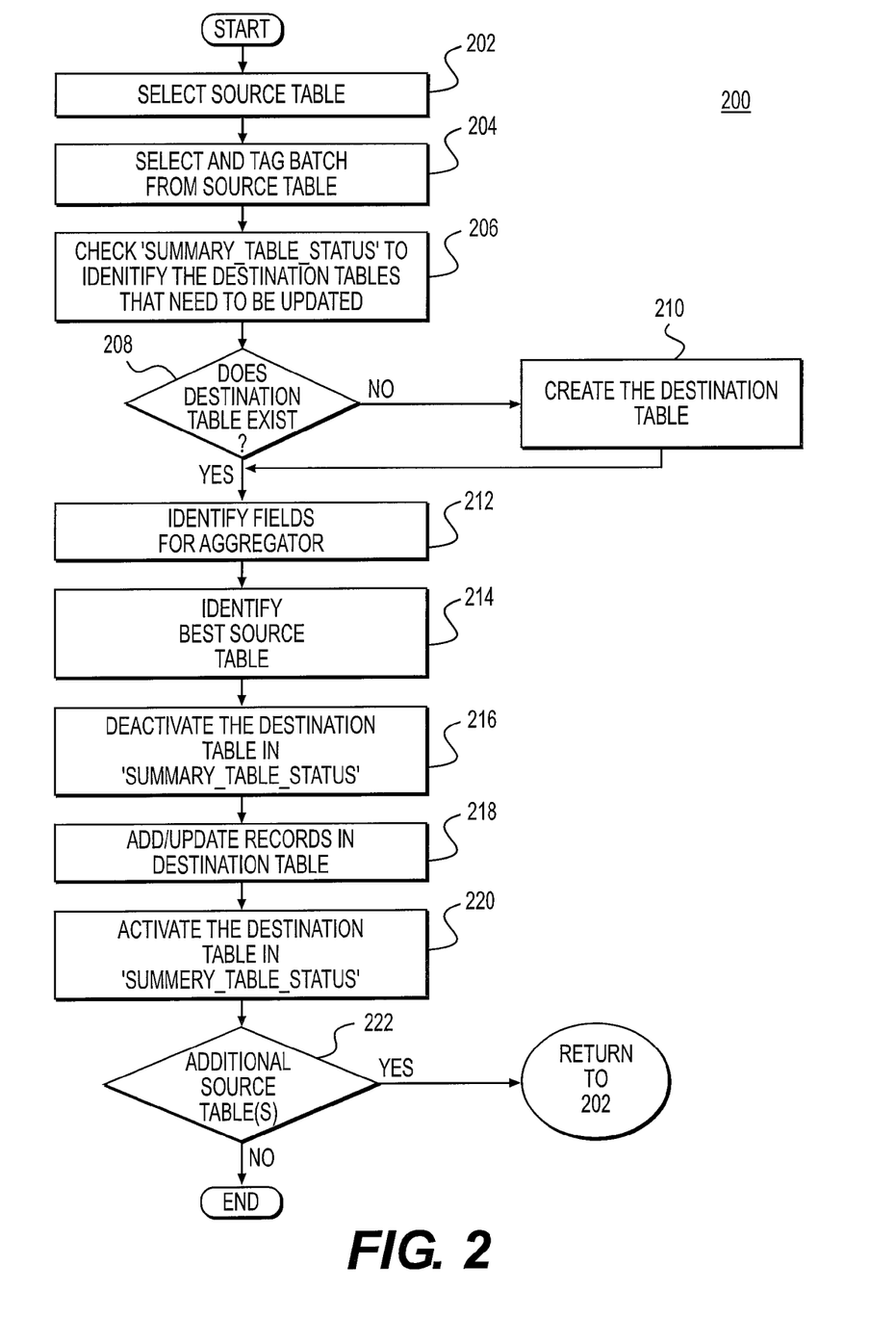
FIG. 2 is a flowchart illustrating an embodiment of a method for data aggregation, targeting and acquisition.

With reference now to FIG. 2, shown is a flowchart illustrating an embodiment of a method 200 data aggregation, targeting and acquisition. Method 200 shown in FIG. 2 includes data aggregation phase of embodiments described herein. Method 200 may be executed by the data aggregator 102. Data, e.g., real-time transactional data, is received and stored in source tables managed by system 100. A source table for a realm is selected, block 202. Here, the selected source table is an actual detail or source table. Accordingly, method 200 may select 202 source table by identifying a table in Summary Table Status table that has a Score=0. The first source table listed in the Summary Table Status table may be the source table selected 202.

A batch of new data records in the selected source table are selected and tagged or stamped, block 204. In embodiments, new data is constantly and continuously received and entered into source tables. In embodiments, each time an aggregator process is run, records that have not been stamped previously are selected, up to a pre-defined number of records (this is the pre-defined batch size). So if there are 20,000 records that have not been previously stamped, and the batch size has been set to 5000, then 5000 records will be selected 204, then another batch of 5000 are selected 204 (e.g., after blocks 206-220, and so on, until there are no more unstamped records. In this manner, batches of data fields in the source table that have new data are identified and selected for aggregation. The destination tables that need to be updated are identified, block 206. Method 200 may check the Summary Table Status table to determine which destination tables need to be updated. For example, those tables that have a Score greater than 0 and which are of the same Realm as the selected source table will be destination or summary tables of the selected source table and, therefore, will have data fields that need to be updated with aggregated data from the selected source table.

With continuing reference to FIG. 2, method 200 determines if each identified destination table exists, block 208. If a destination table does not exist, the destination table is created, block 210, e.g., through known database table creation methods. The data fields that need to be aggregated in each identified destination table are identified, block 212. Method 200 may identify these fields by examining the Summary Field Definitions table. The Summary Field Definitions table lists the data fields of each destination table, and the detail or source table. If a data field is updated in the detail or source table, the data will from the data field will need to be aggregated in the destination tables that have the corresponding field. For each identified destination table, the best source table is identified, block 214. As explained above, the best source table for a destination table may be another destination table. In that manner, the main detail or source table for the data (i.e., the source table with Score=0) will only need to be accessed once for certain data fields. Once the data has been aggregated to a destination table, that destination table may serve as the source table for other destination tables, as described above.

When method 200 is prepared to aggregate data into the selected destination tables, each selected destination table is deactivated, block 216. This prevents the destination tables from being accessed for reporting until they have been activated. Likewise, until a destination table has been updated and re-activated, it may not be used as a source table for another destination table. A de-activated destination table is updated, block 218, aggregating data from the selected source table (either directly or from another destination table. Once updated, the destination table is re-activated, block 220. The method 200 repeats blocks 216-220 for all the selected destination tables. Method 200 may determine if there are additional batches of unstamped data fields in the selected source table (by examining the selected source table), and if not, if there are additional source tables, block 222. Whether there are additional source tables may be determined from the Summary Table Status table. If there are additional batches of unstamped data fields, or more source table(s), method 200 returns to block 202. If not, method 200 ends.

With reference again to FIG. 1, data targeter 104 targets and retrieves responsive data to fulfill a data request. The data targeter 104 targets and retrieves data from the aggregated data tables aggregated by the data aggegator 102. The following is a description of a targeting process that may be performed by data targeter 104. Data targeter 104 receives a data request. Data requests may be received as XML reporting requests, or other types of requests. Data targeter 104 identifies the data fields needed to fulfill the data request. From the Summary Field Definitions table, data targeter 104 determines the data tables that contain all the necessary data fields (e.g., by identifying the tables indicated in the Source column that contains all the requested data fields, indicated in the Actual_Field_Name column). From the determined data tables, data targeter 104 determines which are active for reporting, from 'Active' and 'Reporting' flags in Summary Table Status table. From these active tables, data targeter 104 chooses the data table which has the highest score based on the corresponding Score column in the Summary Table Status table. The highest scoring table that is active and has all the requisite data fields will be the most efficient and quickest source of the requested data. By virtue of having the highest score, it will have the least amount of data for data tables having the necessary data fields.

After choosing the target data table, data targeter 104 creates a database data retrieval query (e.g., creates SQL statement for data retrieval) and presents the query to the database 106 for the chosen data table. Data targeter 104 receives and processes the query response from database 106. Data targeter 104 returns the data results to requesting entity.

Figure 3:
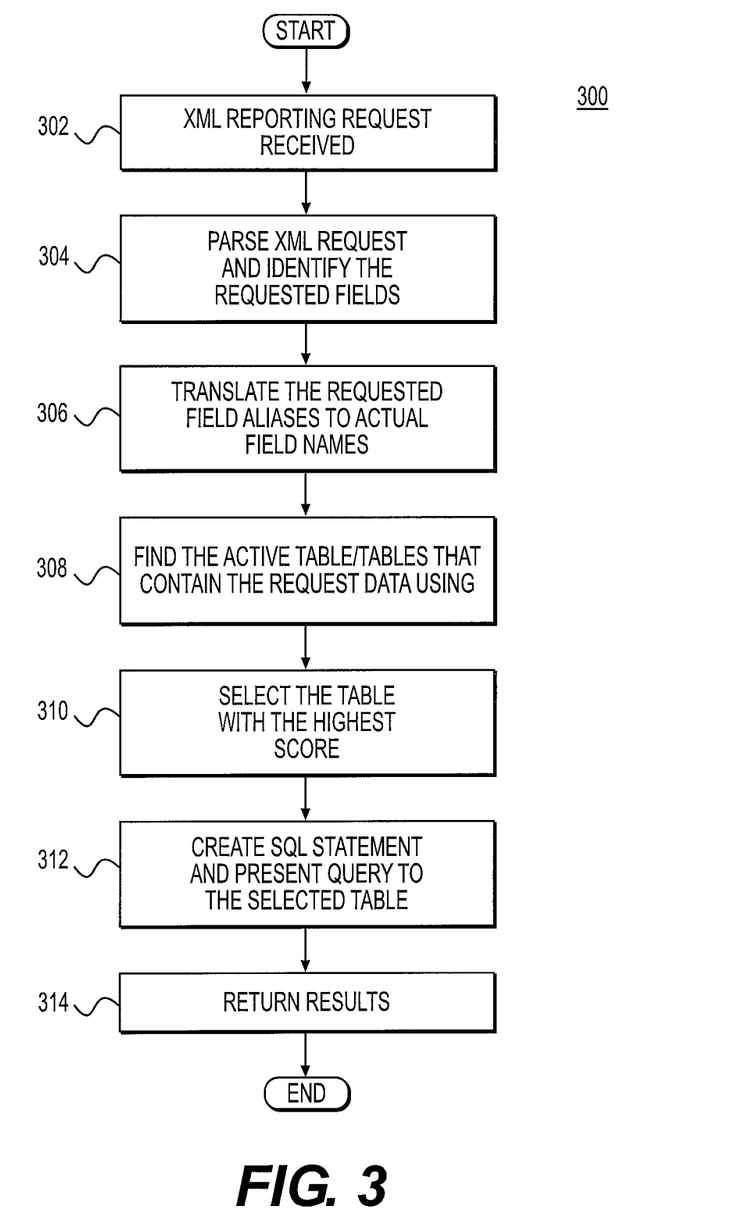
FIG. 3 is a flowchart illustrating an embodiment of a method for data aggregation, targeting and acquisition.

With reference now to FIG. 3, shown is a flowchart illustrating an embodiment of a method 300 for data aggregation, targeting and acquisition. Method 300 shown in FIG. 3 includes targeting and acquisition phase of embodiments described herein. Method 300 may be executed by the data targeter 104. A reporting request is received, block 302. Reporting request may be input into system 100 on which data targeter 104 resides directly or received via a network. Reporting request is a request for data from data tables managed by system 100. Reporting request may be formatted in Extensible Markup Language ("XML"), or other known languages. The requested data fields are identified, block 304. The requested data fields are the data fields in the data tables managed by system 100 that are needed to produce a report requested by request. Data fields may be identified 304 by parsing the request.

Typically, the request will contain alias for the requested data fields. Consequently, method 300 may translate the requested field alias into actual field names, block 306. The actual field names may be the actual field names appearing in the Summary Table Status table. Once the actual field names are known, method 300 may find the active data table or tables that contain the requested data, block 308. These tables may be found 308 by examining the Summary Field Definitions table to determine which data tables contain the requested fields and examining the Summary Table Status table to determine which of these data tables are active. Method 300 then selects the found table with the highest Score, block 310. As discussed above, the table with the highest score that has all of the requested data fields will be the most efficient and quickest to access and from which to retrieve the data. Method 300 may start at the found table with the highest score and work down (examining data tables with lower and lower scores until a table is found that has all the requested data fields). Method 300 creates a data table query to retrieve the data from the selected table (or tables), block 312. The query may be a SQL statement or other similar query. The data is retrieved from the selected table(s) and returned to the requesting entity, block 314. Method 300 may be repeated for additional data requests.

With reference now to FIGS. 4A-4D, the following are illustrative examples of the use of embodiment system and methods described herein for data aggregation, targeting and acquisition.

Example 1

Summary Table Status and Summary Field Definitions Table Sample Implementation This example shows a configuration for an embodiment of system 100 when used to supply up to two summary levels for two detail tables containing different types of information (Call Detail Records (CDR) and device log information).

Figure 4A:
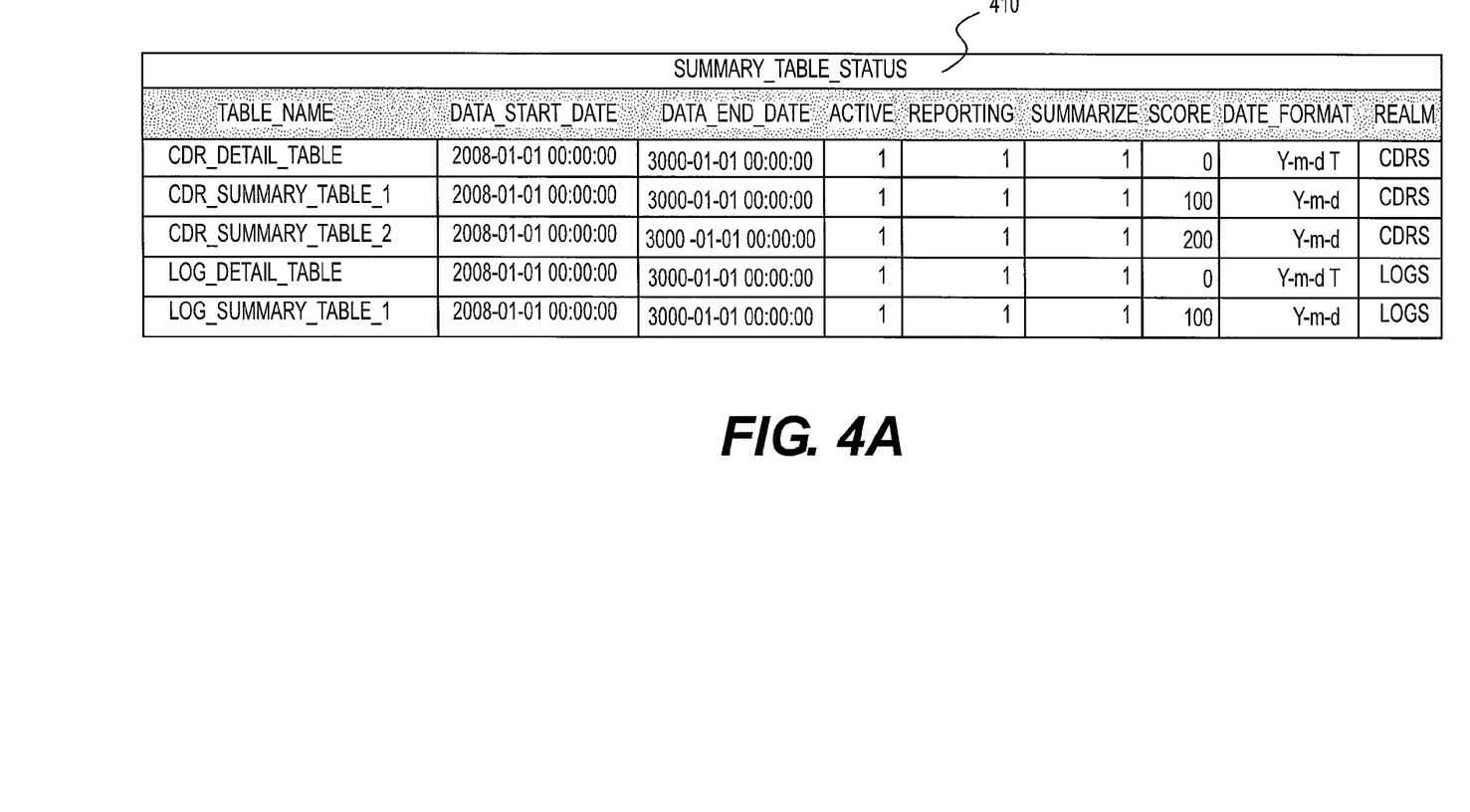
FIGS. 4A-4G illustrate exemplary tables illustrating an example of an implementation of embodiments of a method and system for data aggregation, targeting and acquisition.

With reference now to FIG. 4A, shown is Summary Table Status table 410 with five (5) entries. Three (3) entries in Summary Table Status table 410 are associated with CDR information, as indicated by CDRS under Realm column, and two (2) entries are associated with device log information, as indicated by LOGS under Realm. As shown, each Realm has a detailed source data table (CDR_Detail_Table and LOG_Detail_Table), as indicated by the score of 0 for each of these table entries. As Summary Table Status table 410 indicates, when aggregating CDRs, there will be two level of summary (the most efficient being destination table CDR_SUMMARY_TABLE_2 with a score of 200 followed by CDR_SUMMARY_TABLE_1 with a score of 100). Note, the scores may be set arbitrarily. The lower the number the more records in the table and, therefore, the less efficient is the table, i.e., the longer it will take to read data from the table. Tables with a score of 0 are detail tables with no aggregation applied. Both destination tables will contain information summarized by day, as shown by date format.

In addition, this example allows for one level of aggregation of the LOG_DETAIL_TABLE with daily totals stored in the LOG_SUMMARY_TABLE_1. All of the summaries have been available since Jan. 1 of 2008 and are set to expire Jan. 1, 3000 (i.e., practically never). All summaries are active (i.e., not in repair or maintenance) and are available for both aggregation and targeting.

Figure 4B:
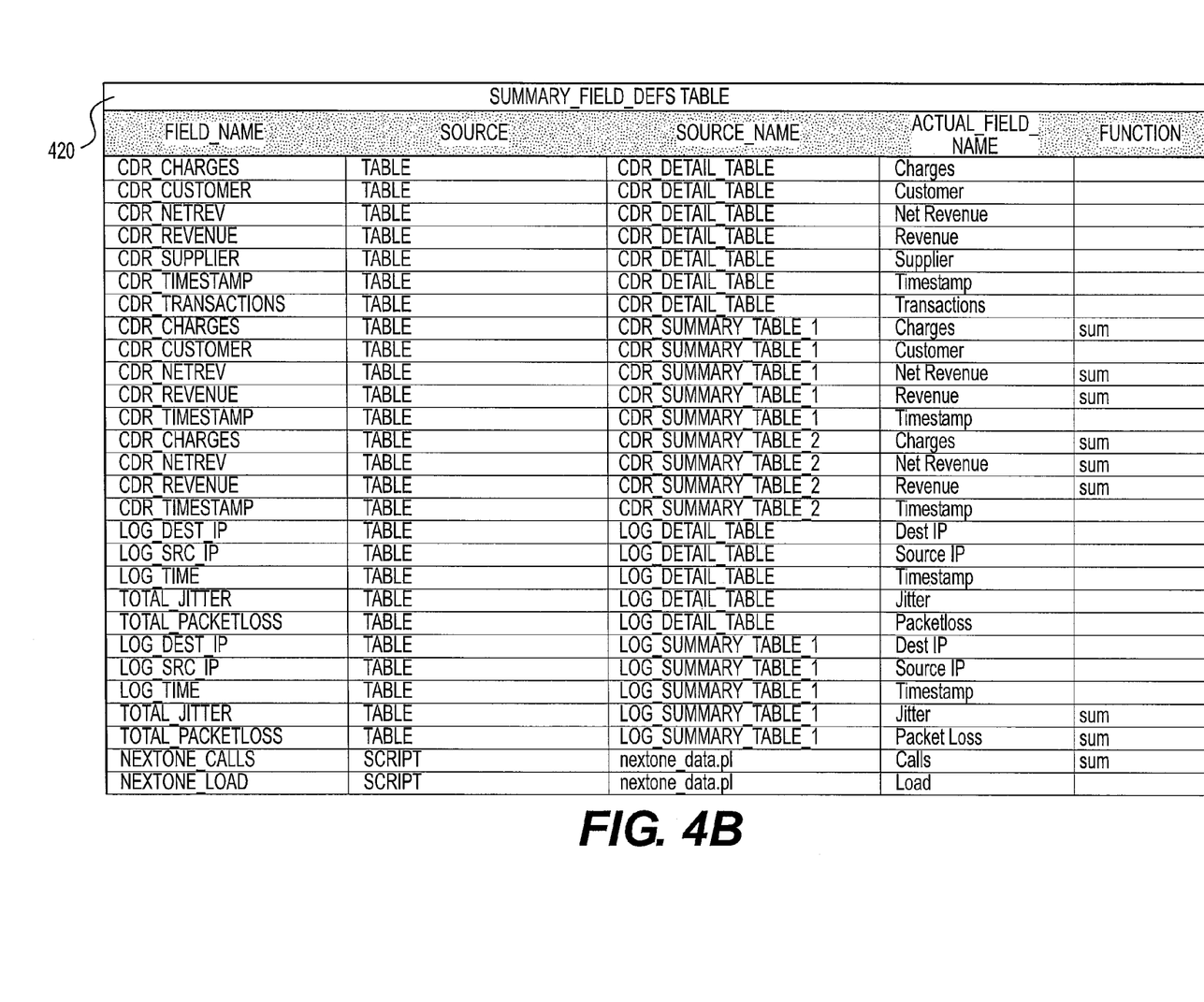

With reference now to FIG. 4B, shown is a Summary Field Definitions table 420 that would be configured in support of Summary Table Status table 410. Using this configuration, the detail records that are collected from the CDR_DETAIL_TABLE are aggregated to (and therefore targeted from) the two summary tables CDR_SUMMARY_TABLE_1 and CDR_SUMMARY_TABLE_2. As indicated in Summary Field Definitions table 420, CDR_SUMMARY_TABLE_1 440 (see FIG. 4C) will contain the accumulations of "Charges", "Net Revenue" and "Revenue" by "Customer" and "Timestamp" with the precision of the "Timestamp" being established with the "Date_Format" column of Summary Table Status table 410. Likewise, as indicated in Summary Field Definitions table 420, CDR_SUMMARY_TABLE_2 450 (see FIG. 4D) will contain the accumulations of the same fields but will be less detailed by aggregating the data only by the "Timestamp" field as formatted according to the "Date_Format" column of Summary Table Status table 410.

Figure 4C:
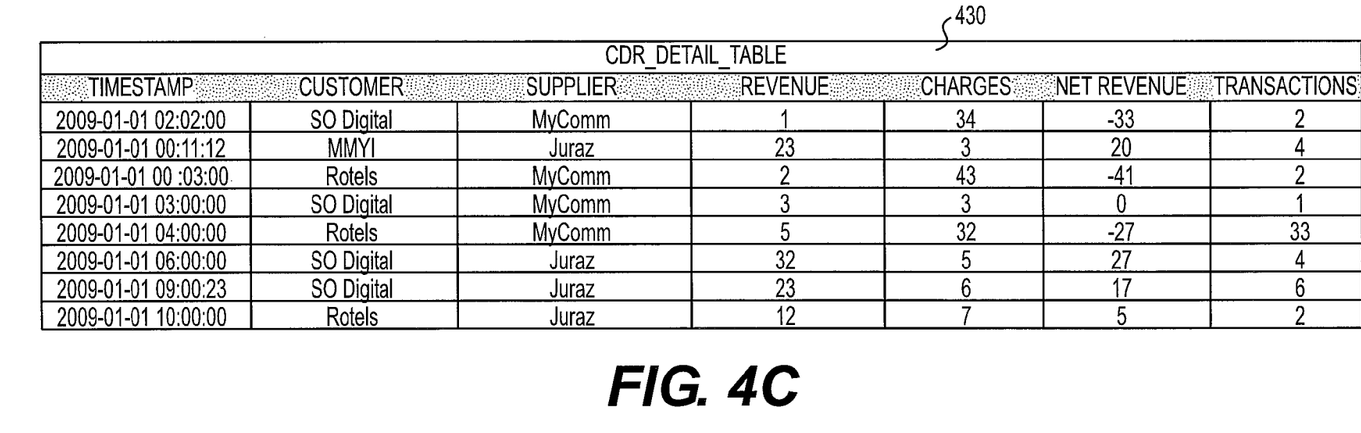
Figure 4D:
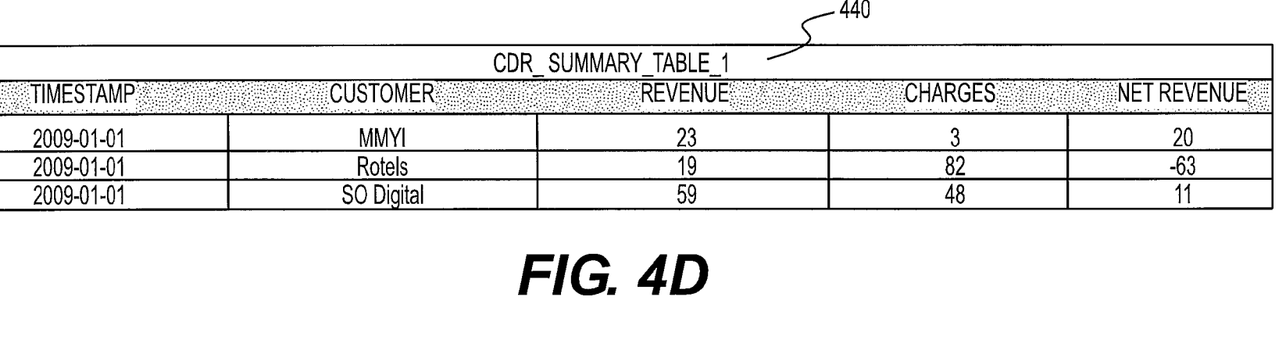
Figure 4E:
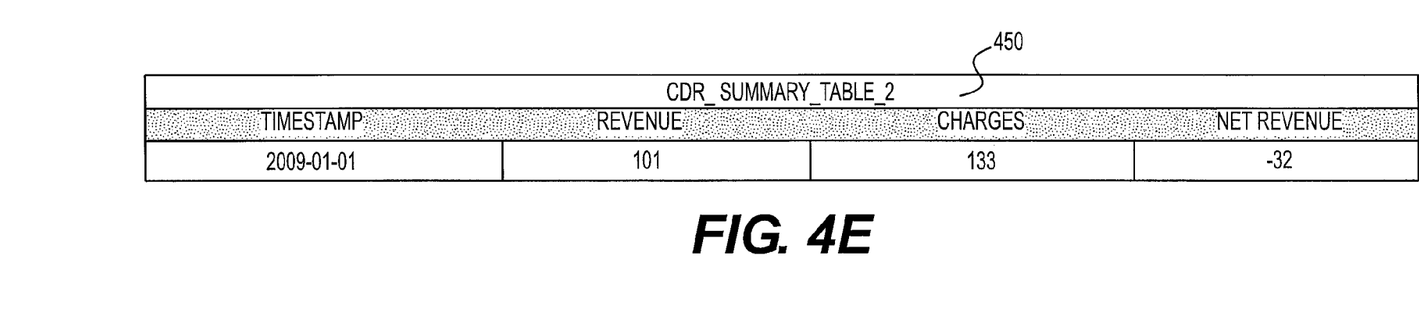

If the data request received by the data targeter 104 includes the customer information, then the system 100 will choose CDR_SUMMARY_TABLE_1 440. Accessing and retrieving data from CDR_SUMMARY_TABLE_1 440 will be a bit slower, then CDR_SUMMARY_TABLE_2 450, because CDR_SUMMARY_TABLE_1 440 will contain more data (it is more specific). Accordingly, if the request is only interested in totals by day, CDR_SUMMARY_TABLE_2 450 will be selected as it will have all of the information necessary and will likely be much faster due to the fewer number of records (it is less specific).

With reference now to FIG. 4C, shown is CDR_DETAIL_TABLE 430. Data aggregator 102 may create destination tables (CDR_SUMMARY_TABLE_1 440 and CDR_SUMMARY_TABLE_2 450) by aggregating the data from CDR_DETAIL_TABLE 430 according to the configuration data in Summary Table Status table 410.

Example 2

Detail and Summary Result Tables for Device Log Records

Again using the configurations of FIGS. 4A and 4B, the system 100 has the ability to accumulate and target information for a completely different set of information, device log files. This information is different in format, content, volume and audience than the CDR data. Therefore, the handling of the information is not the same as that of the CDRs.

Figure 4F:
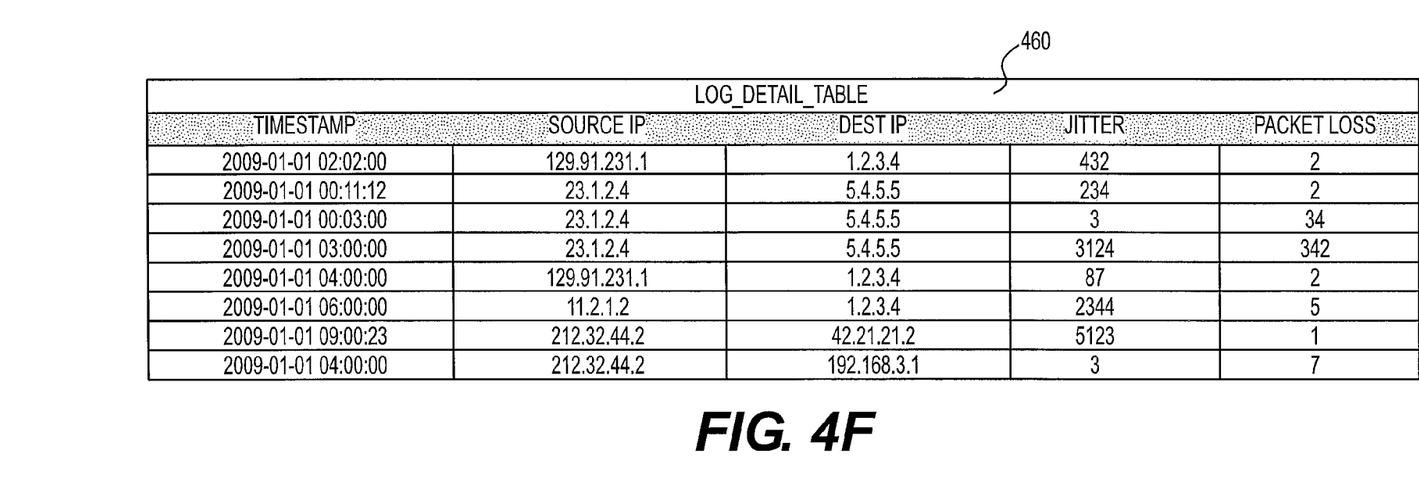
Figure 4G:
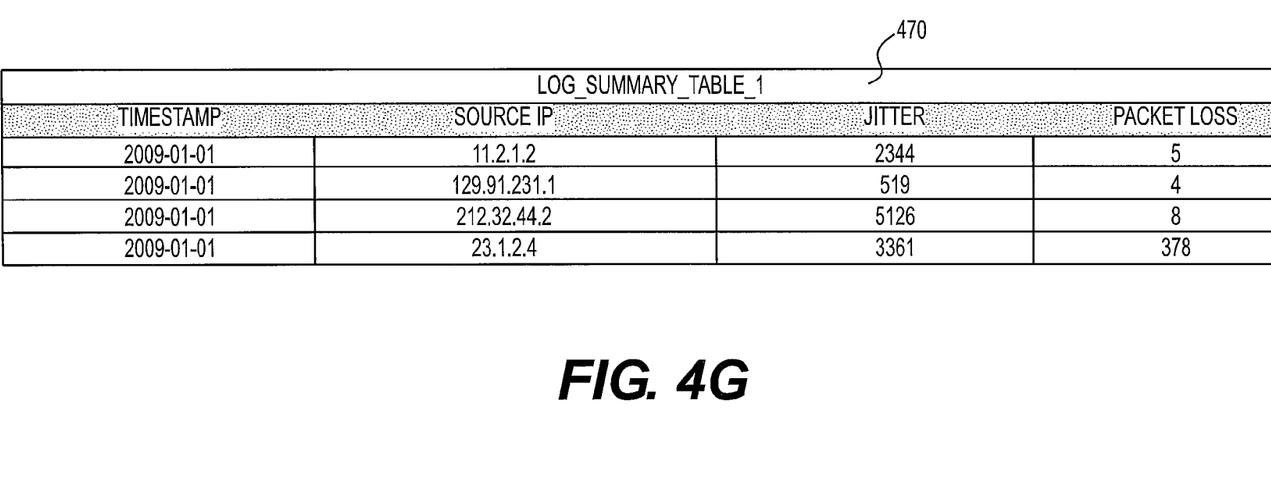

With reference now to FIG. 4F, according to the Summary Table Status table 410, the source table LOG_DETAIL_TABLE 460 will have only one summary or destination table, LOG_SUMMARY_TABLE_1 470, (see FIG. 4G). This summary table 470 will summarize the "Jitter" and "Packet Loss" values by "Timestamp", "Source IP" and "Dest IP". As with the CDR destination tables, the "timestamp" will be formatted according to the "Date_Format" column from the Summary Table Status table 410.

Figure 5:
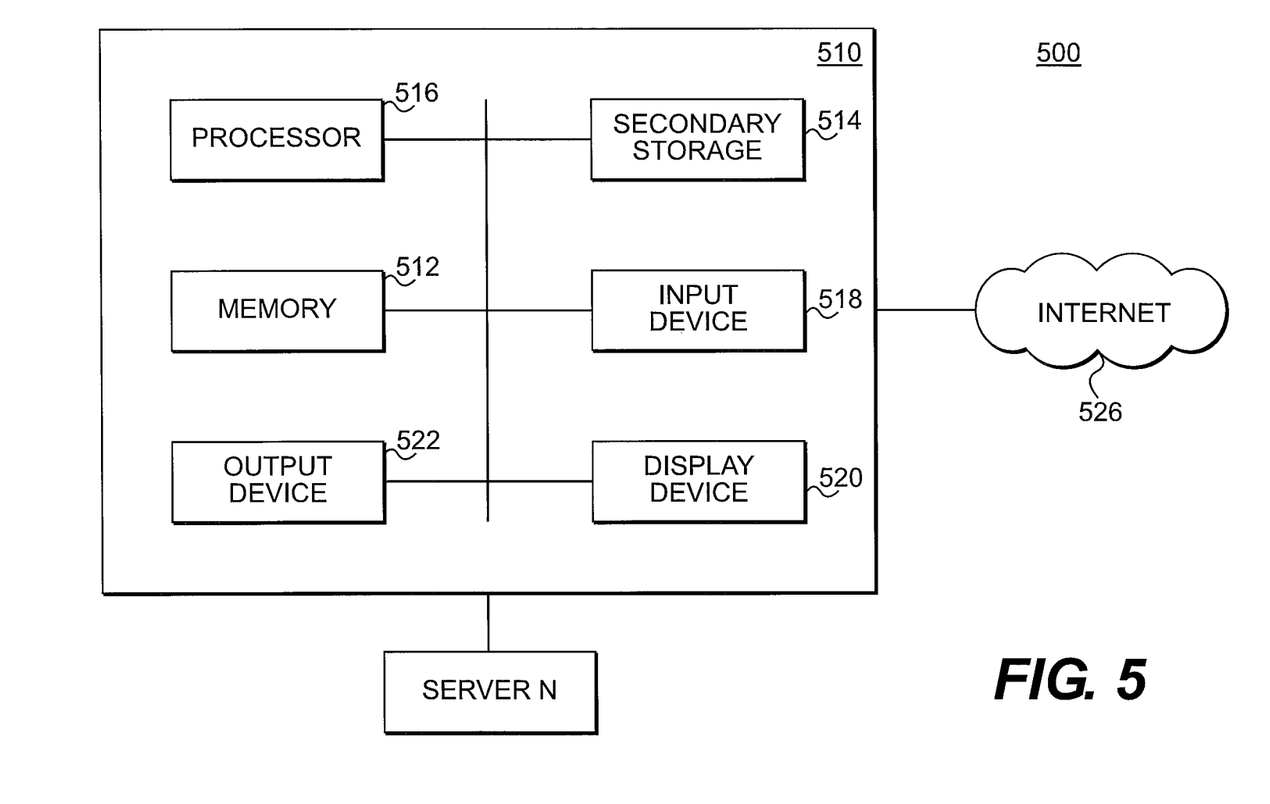
FIG. 5 is a block diagram illustrating exemplary hardware components of an embodiment of a system for data aggregation, targeting and acquisition.

With reference now to FIG. 5, shown is a block diagram illustrating exemplary hardware components for implementing an embodiment of system 500 for data aggregation, targeting and acquisition. Server 510, or other computer similarly configured, may include and run data aggregator 102 and/or data targeter 104 to perform functions described herein, including steps of method 200 described above. Server 510 may connect with Internet, or other network, to receive incoming transactional data and configuration data for data aggregation, targeting and acquisition, as well as data requests.

Server 510 typically includes a memory 512, a secondary storage device 5414, and a processor 516. Server 510 may also include a plurality of processors 516 and be configured as a plurality of, e.g., bladed servers, or other known server configurations. Server 510 may also include an input device 518, a display device 520, and an output device 522. Memory 512 may include random-access memory ("RAM") or similar types of memory, and it may store one or more applications for execution by processor 516. Secondary storage device 514 may include a hard disk drive, floppy disk drive, CD-ROM drive, or other types of non-volatile data storage. Processor 516 executes the application(s), such as data aggregator 102 and data targeter 104, which are stored in memory 512 or secondary storage 514, or received from the Internet or other network 526. The processing by processor 516 may be implemented in software, such as software modules, for execution by computers or other machines. These applications preferably include instructions executable to perform the methods described above and illustrated in the FIGS. herein. The applications preferably provide graphical user interfaces (GUIs) through which participants may view and interact with data aggregator 102 and data targeter 104.

Server 510 may store a database structure in secondary storage 514, for example, for storing and maintaining information regarding the data tables, configuration data and output requested data and the methods described herein. For example, it may maintain a relational or object-oriented database for storing the source data tables, destination data tables and configuration tables, and other information necessary to perform the above-described methods.

Also, as noted, processor 516 may execute one or more software applications in order to provide the functions described in this specification, specifically to execute and perform the steps and functions in the methods described above. Such methods and the processing may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the system 500.

Input device 4518 may include any device for entering information into server 510, such as a keyboard, mouse, cursor-control device, touch-screen, microphone, digital camera, video recorder or camcorder. The input device 518 may be used to enter information into GUIs during performance of the methods described above. Display device 520 may include any type of device for presenting visual information such as, for example, a computer monitor or flat-screen display. The display device 520 may display the GUIs and/or output from data targeter 104. Output device 522 may include any type of device for presenting a hard copy of information, such as a printer, and other types of output devices include speakers or any device for providing information in audio form.

Examples of server 510 include dedicated server computers, such as bladed servers, personal computers, laptop computers, notebook computers, palm top computers, network computers, or any processor-controlled device capable of executing a web browser or other type of application for interacting with the system.

Although only one server 510 is shown in detail, system 500 may use multiple servers as necessary or desired to support the users and may also use back-up or redundant servers to prevent network downtime in the event of a failure of a particular server. In addition, although server 510 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or read-only memory ("ROM"). The computer-readable media may include instructions for controlling a computer system, server 510, to perform a particular method, such as methods described above.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A method for data aggregation, targeting and acquisition, comprising:
    receiving data and storing the data in one or more source data tables;
    selecting one of the one or more source data tables, wherein the selected source data table includes updated data fields;
    identifying a plurality of destination data tables that need to be updated, wherein each destination data table is linked to and contains an aggregation of a subset of data from the selected source data table;
    identifying one or more data fields in the identified destination data tables that need to be updated with data from the updated data fields in the selected source data table;
    determining for each identified destination data table, a best aggregation source data table, wherein the best aggregation source data table is a data table that contains all of the data fields of the each identified destination data table and has the fewest data fields, and the best aggregation source data table is the selected source data table or another destination data table;
    de-activating the each identified destination data table, wherein the de-activated destination tables are prevented from being accessed for reporting;
    updating data fields in the each de-activated identified destination data table, wherein the data fields in the each identified destination data table are updated with data aggregated from the determined best aggregation source data table associated with the each identified destination data table;
    re-activating the each identified destination data table after the updating;
    receiving, using a processor and memory, a request for a data report;
    identifying, using the processor, from the request, data fields needed to fulfill the request;
    finding, using the processor, data tables that contain the identified data fields;
    determining, using the processor, which found data tables are active for reporting from one or more binary flags;
    selecting, from the determined found active data tables, a data table with the fewest data fields;
    retrieving data directly from the identified data fields from the selected data table with the fewest data fields;
    creating a data request query; and
    transmitting the data request query to the selected data table with the fewest data fields.

2. The method of claim 1 wherein the selecting one of the one or more source data tables selects the selected source data table from a summary data table listing all of the data tables managed by a system.

3. The method of claim 1 wherein the identifying the plurality of destination data tables that need to be updated identifies the destination data tables from a summary data table listing all of the data tables managed by a system.

4. The method of claim 1 wherein the identifying the one or more data fields in the identified destination data tables that need to be updated identifies the one or more data fields from a summary field definition table that lists the data fields of each data table managed by a system.

5. The method of claim 1 wherein the determining a best aggregation source data table for an identified destination data table identifies the data table that contains all of the data fields in the destination data table.

6. The method of claim 1 further comprising returning a data report containing the data from the identified data fields to an entity that transmitted the request for a data report.

7. The method of claim 1 wherein the identifying data fields needed to fulfill the request comprises parsing the received request to identify the data fields.

8. The method of claim 1 further comprising translating data field aliases to actual field names.

9. The method of claim 1 wherein the finding finds the data tables that contain the identified data fields from a summary field definition table that lists the data fields of each data table managed by a system.

10. The method of claim 1 wherein the selecting selects the data table with the fewest data fields finds the data table that has the identified data fields and that has a highest score listed in a summary data table listing all of the data tables managed by a system, wherein the listed score indicates the complexity of the data table.

11. A system for data aggregation, targeting and acquisition, comprising:
a computer including a processor and memory, wherein the memory includes a computer program stored therein that includes instructions that are executed by the processor for:
receiving data and storing the data in one or more source data tables;
selecting one of the one or more source data tables, wherein the selected source data table includes updated data fields;
identifying a plurality of destination data tables that need to be updated, wherein each destination data table is linked to and contains an aggregation of a subset of data from the selected source data table;
identifying one or more data fields in the identified destination data tables that need to be updated with data from the updated data fields in the selected source data table;
determining for each identified destination data table, a best aggregation source data table, wherein the best aggregation source data table is a data table that contains all of the data fields of the each identified destination data table and has the fewest data fields, and the best aggregation source data table is the selected source data table or another destination data table;
de-activating the each identified destination data table, wherein the de-activated destination tables are prevented from being accessed for reporting;
updating data fields in the each de-activated identified destination data table, wherein the data fields in the each identified destination data table are updated with data aggregated from the determined best aggregation source data table associated with the each identified destination data table;
re-activating the each identified destination data table after the updating;
receiving a request for a data report;
identifying from the request, data fields needed to fulfill the request;
finding data tables that contain the identified data fields;
determining, using the processor, which found data tables are active for reporting from one or more binary flags;
selecting, from the determined found active data tables, a data table with the fewest data fields;
retrieving data directly from the identified data fields from the selected data table with the fewest data fields;
creating a data request query; and
transmitting the data request query to the selected data table with the fewest data fields.

12. The system of claim 11 wherein the selecting one of the one or more source data tables selects the selected source data table from a summary data table listing all of the data tables managed by a system.

13. The system of claim 11 wherein the identifying the plurality of destination data tables that need to be updated identifies the destination data tables from a summary data table listing all of the data tables managed by a system.

14. The system of claim 11 wherein the identifying the one or more data fields in the identified destination data tables that need to be updated identifies the one or more data fields from a summary field definition table that lists the data fields of each data table managed by a system.

15. The system of claim 11 wherein the determining a best aggregation source data table for an identified destination data table identifies the data table that contains all of the data fields in the destination data table.

16. The system of claim 11 the instructions further including instructions for returning a data report containing the data from the identified data fields to an entity that transmitted the request for a data report.

17. The system of claim 11 wherein the identifying data fields needed to fulfill the request comprises parsing the received request to identify the data fields.

18. The system of claim 11 the instructions further including instructions for translating data field aliases to actual field names.

19. The system of claim 11 wherein the finding finds the data tables that contain the identified data fields from a summary field definition table that lists the data fields of each data table managed by a system.

20. The system of claim 11 wherein the selecting the data table with the fewest data fields finds the data table that has the identified data fields and that has a highest score listed in a summary data table listing all of the data tables managed by a system, wherein the listed score indicates the complexity of the data table.

* * * * *